(12) United States Patent
Masinter et al.

(10) Patent No.: US 7,577,689 B1
(45) Date of Patent: Aug. 18, 2009

(54) METHOD AND SYSTEM TO ARCHIVE DATA

(75) Inventors: Larry Masinter, Los Altos, CA (US); Michael J. Welch, Simi Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 275 days.

(21) Appl. No.: 11/153,100

(22) Filed: Jun. 15, 2005

(51) Int. Cl.
*G06F 12/00* (2006.01)
*G06F 17/30* (2006.01)
*G06F 13/00* (2006.01)
*G06F 13/28* (2006.01)

(52) U.S. Cl. .................. 707/204; 711/161; 711/162
(58) Field of Classification Search ............... None
See application file for complete search history.

(56) References Cited

U.S. PATENT DOCUMENTS

| | | | | |
|---|---|---|---|---|
| 6,654,758 | B1* | 11/2003 | Teague ............... | 707/101 |
| 6,886,160 | B1* | 4/2005 | Lee .................. | 717/173 |
| 2003/0154254 | A1* | 8/2003 | Awasthi ............. | 709/206 |
| 2004/0030982 | A1* | 2/2004 | Aldridge et al. ..... | 714/776 |
| 2007/0143097 | A1* | 6/2007 | Brunet et al. ....... | 703/23 |

OTHER PUBLICATIONS

"DISP: Practical, Efficient, Secure and Fault Tolerant Data Storage for Distributed Systems" (published in Dec. 2003) and available at: http://web.archive.org/web/20040520233145/http://www.eecs.harvard.edu/~ellard/DISP/Papers/dsn04-tech.pdf http://web.archive.org/web/20040520233145/http://www.eecs.harvard.edu/~ellard/DISP/.*
"What is a Zip File Anyhow?" archived on Feb. 22, 1997 at: <http://web.archive.org/web/19970222065501/www.winzip.com/aboutzip.htm>.*
"Electronic document file format for long-term preservation" (hereafter "PDFA") (published by the International Standards Organisation in 2004) available at: http://web.archive.org/web/20050615111902/http://www.archivists.org.au/pubs/ISO_DIS_19005-1.pdf.*
"Metadata describes . . . how the data is formatted" according to the definition at: http://web.archive.org/web/20040603054948/http://www.webopedia.com/TERM/m/metadata.html.*

(Continued)

*Primary Examiner*—Charles Rones
*Assistant Examiner*—Harold A Hotelling
(74) *Attorney, Agent, or Firm*—Schwegman, Lundberg & Woessner, P.A.

(57) ABSTRACT

A method and a system is provided of to process data. For example, the method and system may be used to archive documents. In an embodiment, the method includes receiving original data for archiving and converting the original data into a plurality of shares using secret sharing. The plurality of shares may be distributed (e.g., to a plurality of remote repositories that each store a share. The plurality of shares may be distributed via a wide area network to a plurality of Internet Service Providers, for example, via an email message which is stored thereby to archive the share. A header of the email message may be used as a time stamp for each share. The repositories may be independent and geographically dispersed and a monitor may be provided to monitor a share stored at each repositories.

16 Claims, 11 Drawing Sheets

OTHER PUBLICATIONS

Ellard, Daniel, et al., "DISP: Practical, Efficient, Secure and Fault-Tolerant Distributed Data Storage", *ACM Transactions on Storage*, 1(1), (Dec. 2004),71?94.

Mearian, Lucas, "Bulletproof Storage", *Computerworld*, (Apr. 11, 2005).

Tucek, Joseph, et al., "Trade-offs in Protecting Storage: A Meta-Data Comparison of Cryptographic, Backup/Versioning, Immutable/Tamper-Proof, and Redundant Storage Solutions", *Proceedings of the 22nd IEEE/13th NASA Goddard Conference on Mass Storage Systems and Technologies (MSST 2005)*, (2005), 1-12.

\* cited by examiner

METHOD AND SYSTEM TO ARCHIVE DATA

TECHNICAL FIELD

The present application relates generally to the technical field of archiving data. For example, an embodiment of the invention relates to document archiving using secret sharing or information dispersal techniques.

BACKGROUND

Digital documents may be stored on physical media or hardware such as hard disks or the like and are therefore subject to typical disk failure scenarios. Accordingly, data is typically backed up so that a disk failure would result in minimal loss of data. In addition to accidental loss, malicious loss such as intentional deletion of data on a compromised storage device is also possible. Data stored in a storage device may also become corrupted and hardware devices can misread bits, miswrite bits, have sectors go bad, and/or suffer other data corruption problems.

SUMMARY

According to one example embodiment, there is provided a system and a method to archive data (e.g., documents). The invention extends to a machine-readable medium for performing any one or more of the methodologies described herein.

Other features will be apparent from the accompanying drawings and from the detailed description that follows.

BRIEF DESCRIPTION OF THE DRAWINGS

Embodiments of the present invention are illustrated by way of example and not limitation in the figures of the accompanying drawings, and in which like references indicate the same or similar elements.

In the drawings.

DETAILED DESCRIPTION

A method and system to archive data (e.g., documents) are described. In the following description, for purposes of explanation, numerous specific details are set forth in order to provide a thorough understanding of embodiments of the present invention. It will be evident, however, to one skilled in the art that the present invention may be practiced without these specific details. For the purposes of this specification, the term "data" is intended to include any digital data or documents (e.g., photographs, computer files, text documents etc.).

An example embodiment of the invention may be applied to long-term archiving of documents. In an embodiment, an archiving system may define a "Virtual Safety Deposit Box" which provides archiving services to individuals, small businesses, or any other party thereby to archive data (e.g., documents such as important files, or any other data/information) at distributed repositories. The distributed repositories may be provided by distributed service providers (e.g., different Internet Service providers or ISPs). It will be appreciated that the invention may find application in any distributed technology (e.g., peer-to-peer services, or the like) to provide long-term availability of documents. In an embodiment, documents are converted to an archive appropriate format including metadata prior to committing the archive documents to storage. Other aspects of one or more different example embodiments include gathering of metadata associated with a document to be archived, performing secret sharing/information dispersal, providing access control (e.g., via access privileges) to archived data, time stamping of archived data, and the like.

In an example embodiment secret sharing technology is used when archiving a document/data. In this example embodiment, a document may be defined as comprising a plurality of secrets which are then used to create other pieces of data (shares or secret shares) which are then stored or archived. In an embodiment of the invention, the shares are then stored in repositories at a plurality of different locations (e.g., geographically dispersed locations). In order to recover the secret (and thus the original document) a threshold (K) of shares is required. In an example embodiment, many more than K copies (N copies) of the shares are created so that even if some of the shares are lost (e.g., failure of one or more data repositories), K copies may still be available to recover the original document. Thus, in an example embodiment, documents in the archiving system may be kept for a long term and, using secret sharing, the documents may kept secret. It is however to be appreciated that the present invention is not limited to archiving documents using secret sharing.

Figure 1:
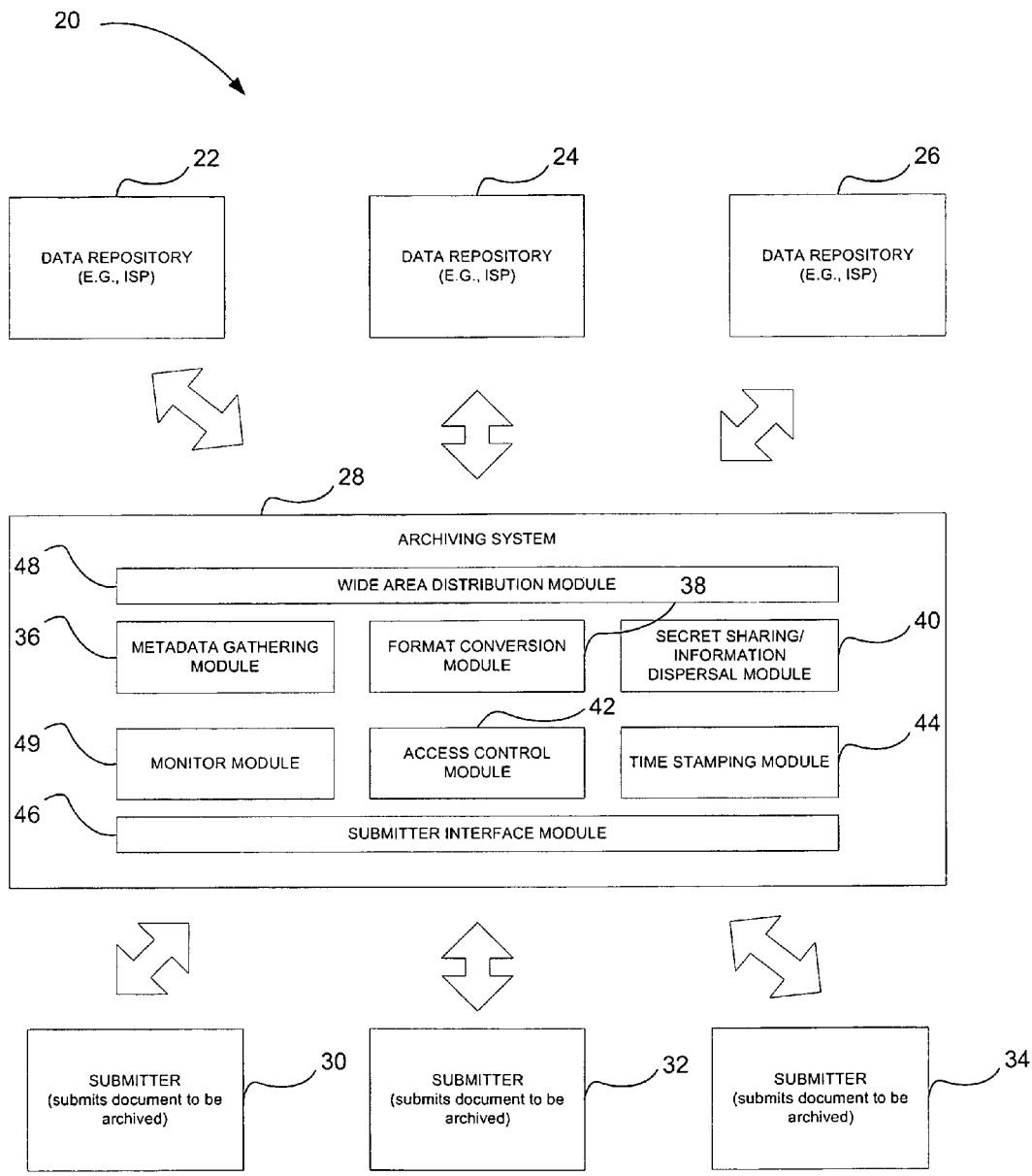
FIG. 1 shows schematic representation of a document archiving system in accordance with an example embodiment of the invention.

Referring to FIG. 1, reference 20 generally indicates a document archiving system in accordance with an example embodiment of the invention. The archiving system 20 includes data repositories 22-26, an archiving system 28, and document submitters 30-34. It will be appreciated that the archiving system 20 may include any number of data repositories and any number of document submitters that may submit documents for archiving. The archiving system 28 is shown by way of example to include a metadata gathering module 36, a format conversion module 38, a secret sharing/information dispersal module 40 (or processor module), an access control module 42, a time stamping module 44, a submitter interface module 46, a wide area distribution module 48, and a monitor module 49. The monitor module 49 may periodically check with repositories 22-26 to make sure that documents stored at their facility are still in proper order. In a secret sharing embodiment, the monitor module 49 may take corrective action when a number of shares drops to, or below, a threshold or predetermined value. For example, in an embodiment the original data or document may be converted into N shares, each share is stored at one of N repositories wherein K shares are required to recover the document. The monitor module 49 may then monitor the share stored at each of the N repositories and identify when a number of recoverable shares stored across the N repositories drops below a threshold value. The threshold value may then be K plus a safety factor (e.g., 5 additional shares). It will be appreciated that the larger the value of the safety factor the lower the risk is of the number of good shares (shares which can be used to reconstruct the original data) dropping below the threshold and thus that the document can no longer be recovered.

It will be appreciated that further modules may also be provided. For example, a retriever module may be provided to retrieve a file from the repositories. The retriever module may contact the repositories 22-26 and get the shares to reconstruct the original document. A submitter graphic user interface module and a retriever graphic interface module may also be provided. Further, it is to be appreciated that the modules 36-49 need not be provided at a single facility but may be distributed across one or more computer systems provided at one or more different geographical locations.

Example Metadata Gathering Module

The metadata gathering module 36 may be provided to gather metadata associated with a document to be archived in standard format. Metadata may include data about data. Examples of metadata for a document may include an author of the document, when the document was created, is the document a read-only document, and so on. As in the case with a document to be archived for a long period of time (e.g., 10 years, 20 years, 100 years), there may be no certainty that an appropriate reader or application may still be in existence when the document is retrieved from an archive (e.g., the repositories 22-26). As there may be a problem metadata formats that a user may not be able to represent in the future, a public standard may be used for archiving metadata, for example, the XMP Standard published by Adobe Systems Incorporated. It will be appreciated that metadata associated with the documents can be supplied and stored, either independently or embedded in the archived document. When the metadata is stored with the archived document (or forms part of the archived document) it may assist in proving in the future the validity of the metadata as the same mechanisms may be used to prove the validity of the archived document.

Example Format Conversion Module

The format conversion module 38 may be provided to convert original documents received for archiving at an archiving facility to a suitable form (e.g., a format complying with a global Standards body). Thus, documents received by the archiving system 20 may be received in any one or more of a plurality of different forms or file types (e.g., Adobe's Portable Document Format (PDF), Microsoft's Word format, a JPEG format, and so on). The received document (referred to as an original document) may then be converted into an archiving format. Thus, even if a reader for the specific format in which a document is received is no longer available when the archived document is retrieved, it may still be recovered. An example of such an archiving format is a Digital Negative Specification (DNG) developed by Adobe. It will however be appreciated that the documents may be converted in any suitable archiving format at the archiving system 20. As the documents are converted in one embodiment at the archiving system 20, submitters 30-34 need not be concerned with any format conversion issues which may be handled by the archiving system 20.

In an embodiment, the original document may also be archived. In addition or instead, the original may be converted into the archival form and converted in a well know format such as PDF/A standard. Keeping a copy of the document in PDF/A may provide a secondary copy that may guard against losses during conversion. If the PDF/A reader is no longer available in the future when retrieving the document from the archiving system 20, the primary copy in the standard archiving format would render the document. It is to be noted that the term "original" document is intended to include any data for archiving received by the archiving system 20 and is intended to include copies of data or documents. Thus the term, as used herein, may be synonymous with received "document." In an embodiment, multiple copies in multiple archival formats may be performed (e.g., conversions to both PDF/A and to a sequence of TIFF files). Conversion to multiple archival formats may enhance reliability.

Example Secret Sharing/Information Dispersal Module

The secret sharing/information dispersal module 40 may be provided to create multiple copies of the document for storage at the repositories 22-26. When the archiving system 20 includes secret sharing functionality, shares of the document may be distributed to a plurality of repositories such as the repositories 22-26. In an embodiment including secret sharing, each individual archived document/file may provide no information on the original or received document. In addition or instead, any other information dispersal mechanism(s) may be used. In certain circumstances tampering may be an issue but not the secrecy of the content of the document (e.g., a public document) and a non-secret information dispersal mechanism(s) may be used.

Example Wide Area Distribution Module

The wide area distribution module 48 may be provided to distribute the archive documents to a plurality of repositories (e.g., the repositories 22-26). In an embodiment the documents distributed to the remote repositories 22-26 are already converted into the archival format by the archiving system 20. As each archival document is sent to multiple repositories over a wide area network, protection may be afforded against site failure. Accordingly, the archiving system 20 may have redundancy to tolerate disk failures or the like. In an embodiment where secret sharing is used, different shares generated from an original document may be sent to different repositories 22-26.

In an embodiment, standards based protocols are used to communicate the archival documents to the repositories 22-26. Likewise, standards based protocols may be used to communicate between the submitters 30-34 and the archiving system 20. Accordingly, the archiving system 20 can interface to various distributed computers using standards based protocols. An example of these standards based protocols, which has both storage and retrieval functionality, is an email (or email message) where archival documents may be communicated to the repositories using Simple Mail Transfer Protocol (SMTP). Thus email message protocol may be used to communicate documents between computers. Archived documents may them be retrieved using either Post Office Protocol (POP) or Internet Message Access Protocol (IMAP). The archiving system 20 may then send archival documents in the form of messages and may thus include mail client.

In an embodiment, the archiving system 20 has Web-based Distributed Authoring and Versioning (WebDav) functionality. WebDav is an IETF standard set of platform-independent extensions to HTTP that allows users to collaboratively edit and manage files on remote Web servers. In an embodiment Extensible Markup Language (XML) properties on metadata locking are provided to prevent overwriting of archived documents. In an embodiment, Network File System (NFS) client/server applications may be used. In NFS, access is provided to shared files through an Virtual File System interface that runs on top of TCP/IP. It will be appreciated however that the archiving system 20 may use any other technology and is not limited to this technology.

The selection of the plurality of repositories (e.g., the repositories 22-26) may be dependent on various factors. For example, the repositories may be geographically dispersed to compensate for site failure due to factors such as earthquake, flood and so on. In an embodiment, location of the repositories may be based on organizational distribution factors so that if a company goes bankrupt or ceases to exist, archived documents may still be retrieved. Legal factors may also contribute to the distribution of the repositories. For example, in a secret sharing document archiving scenario, shares may be distributed across various legal jurisdictions so that multiple court orders may be required to retrieve the archived shares. Further, the system 20 may use a number of different software programs to enhance software diversity. Software diversity may protect against one or more software programs being outdated. The system 20 may enhance recovery of an archived document when software and/or hardware failures occur.

Example Access Control Module

The access control module 42 may control access to archived documents archived using the system 20. The access control module 42 may include a handle capability which associates metadata with an archived document when, for example, they are archived as separate files. In an embodiment, a handle may link or associate the archived original document, the converted archival document and the metadata. A handle may be provided which identifies the archived document, specifies user credentials that control access, and so on. A handle may be used in a document monitoring process. As described herein, in an embodiment the original document, the converted archival document, and the metadata may be packaged by the archiving system 20 into a single unit or package (e.g., a single archival file).

Example Times Stamping Module

The time stamping module 44 may be provided to time stamp an archived document at the time that it archived (e.g., sent from the archiving system 20 to one or more of the repositories 22-26). The repositories or storage providers may retain a time stamp of when they receive the document. In an embodiment the repositories 22-26 are independent and each of repositories 22-26 may independently time stamp an archival document upon receipt thereof.

In an embodiment, one or more of the repositories 22-26 may be Internet Service Providers (ISPs). Time stamping documents across multiple ISPs may reduce the likelihood of malicious change to all the timestamps as it would require a person with devious intent to go into every single ISP to attempt to change a timestamp. The archiving system 20 may time stamp each share component that is sent to a particular repository 22-26.

When archived documents are sent via email from the archiving system 20 to the repositories 22-26, the email itself may provide time stamps in its header. Thus retrieving the email (and thus the archived document) would retrieve the original time stamps of the email. Time stamp information from routers, switches, POPs (Points Of Presence) etc. may also provide evidence of the date of archiving the document.

Figure 2:
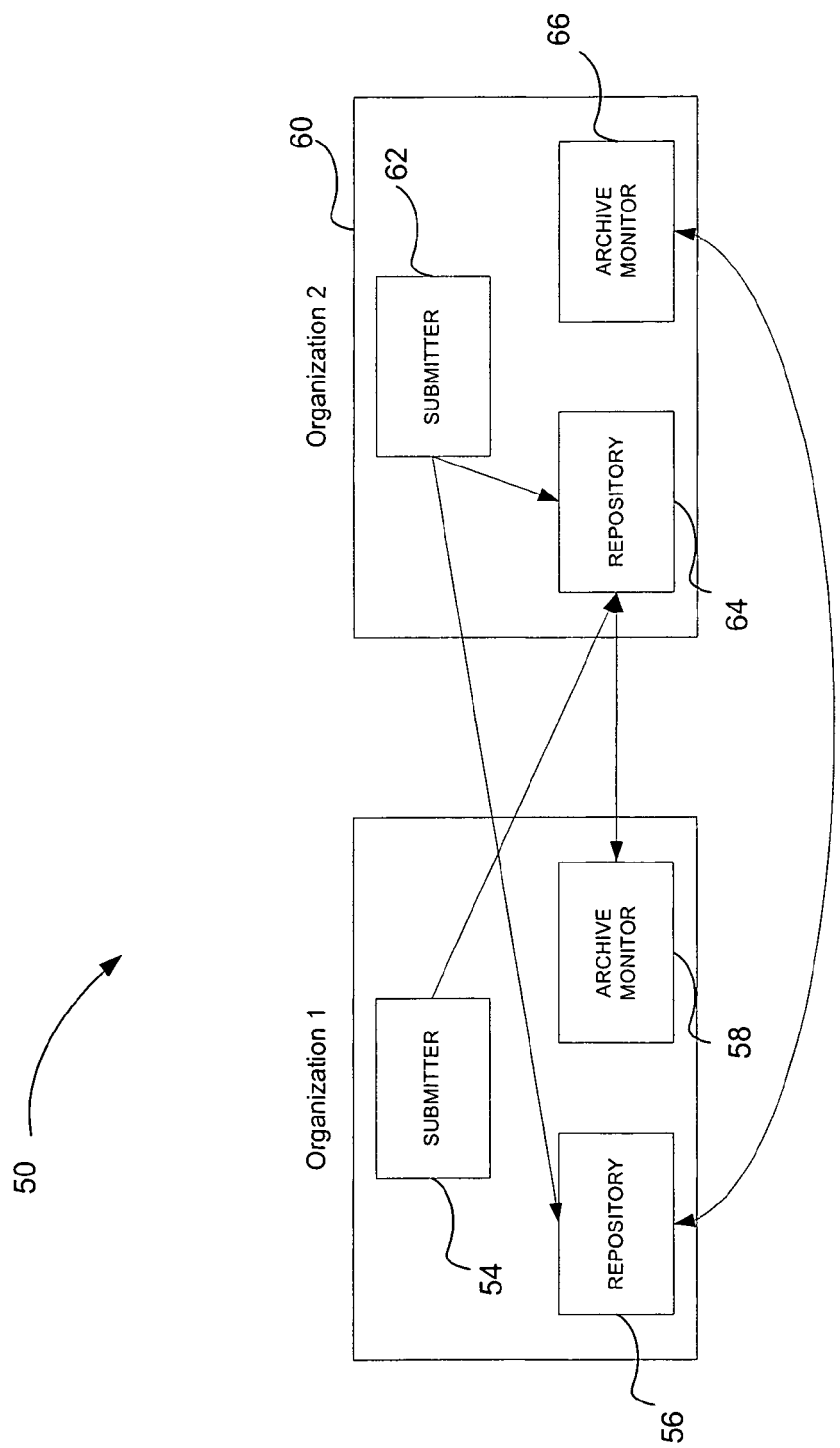
FIG. 2 shows an example configuration of an organizational document archiving system.

Referring in particular to FIG. 2, reference 50 indicates an example configuration of an organizational document archiving system. The system 50 shows, by way of example, two organizations. A first organization 52 has one or more submitters 54, one or more repositories 56 and an archive monitor 58. Likewise, a second organization 60 has one or more submitters 62, one or more repositories 64, and an archive monitor 66. It will be appreciated the organizations 52, 60 may operate many or all of the modules of the archiving system 20. The organizations 52, 60 (or any further organization(s)) may operate as a "consortium" of organizations that trusts all modules within the organization, but does not trust modules or components outside of the organization. The organization 52 may send archive documents (e.g., shares of its archived files) to outside (e.g., untrusted) repositories (e.g., the repository 64 operated by organization 60). The archive monitor 58 (or any other independent monitor) may monitor the repository 64 to periodically determine a status of documents archived at the repository 64. Similar functionality may be performed by the organization 60.

In an embodiment, a single (or small numbers of users) may manage a local database of archived documents and the local database may be periodically archived. The single user's repository may be retrieved given a single key or handle. Storage and access control may be managed to guarantee security of storage but also the ability, if desired, to "pass on" access to others authorized in a controlled manner. In an embodiment functionality may be provided to acquire, at the time of archive, a time-stamp and check of digital signatures in a document to assure legal validity in a variety of jurisdictions.

Figure 3:
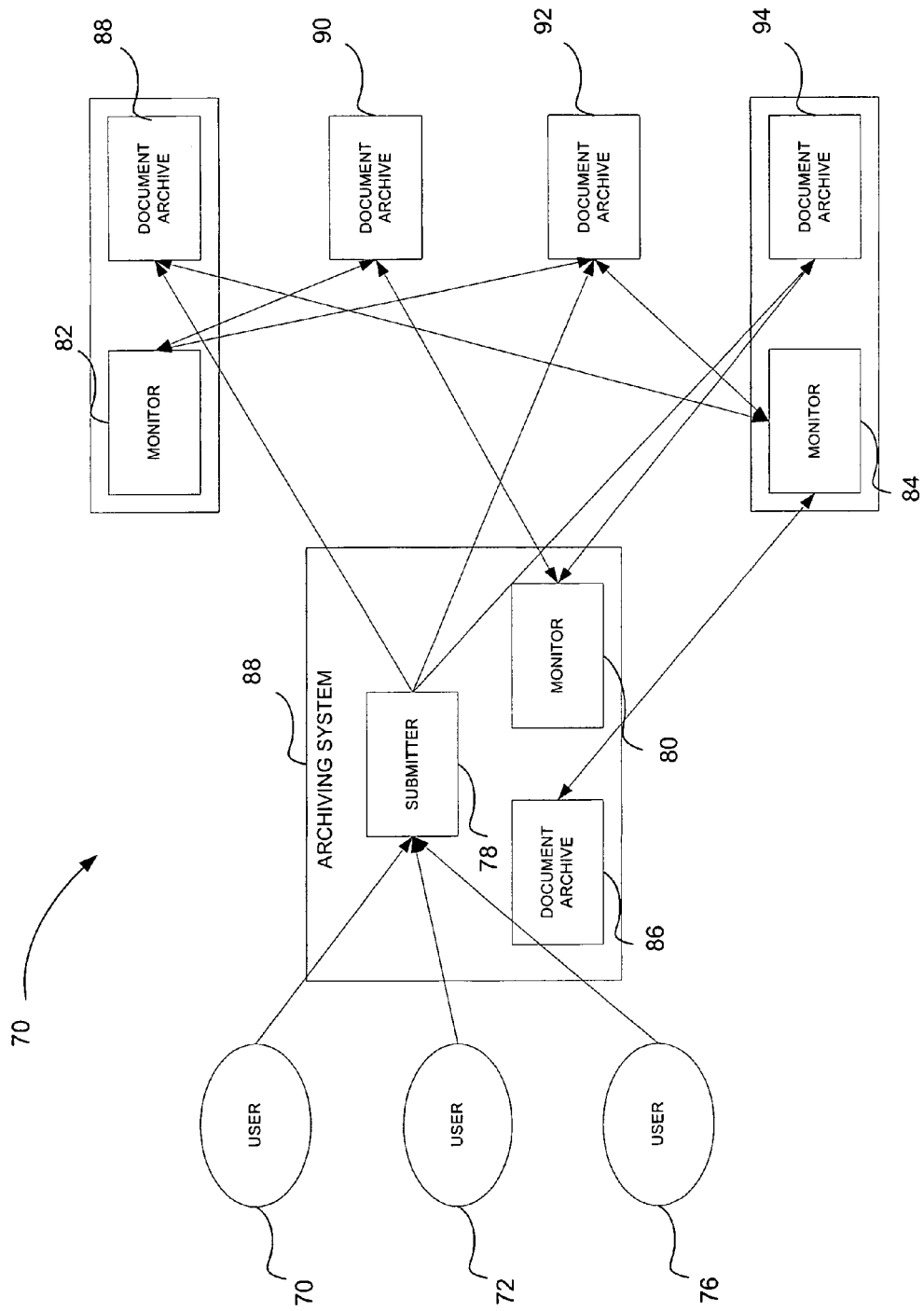
FIG. 3 shows an example configuration of a archiving system where individual users (e.g., individual corporations and home users) can archive documents.

FIG. 3 shows an example configuration of a archiving system 70 where individual users (e.g., individual corporations, home users) can archive documents (e.g., home users may archive personal documents). The functionality performed by the archiving system 70 is similar to that of the archiving system 50 and is shown to include users 72-76, a submitter 78, archiving monitors 80-84 and repositories 86-94. The submitter 78, the archiving monitor 80, and the repository 86 are shown to be provided at a trusted organization hosting the archiving system 20. In the example home user scenario, each home user need optionally enter into a consortium as shown in FIG. 2, and may access an archiving system through a trusted third-party, such as a bank, ISP, school, or other private company. Access may be based on a pay-for service agreement and legal obligations may protect privacy by the provider. It will be appreciated that the actual configuration of the arching systems described herein may vary from embodiment to embodiment.

Figure 4:
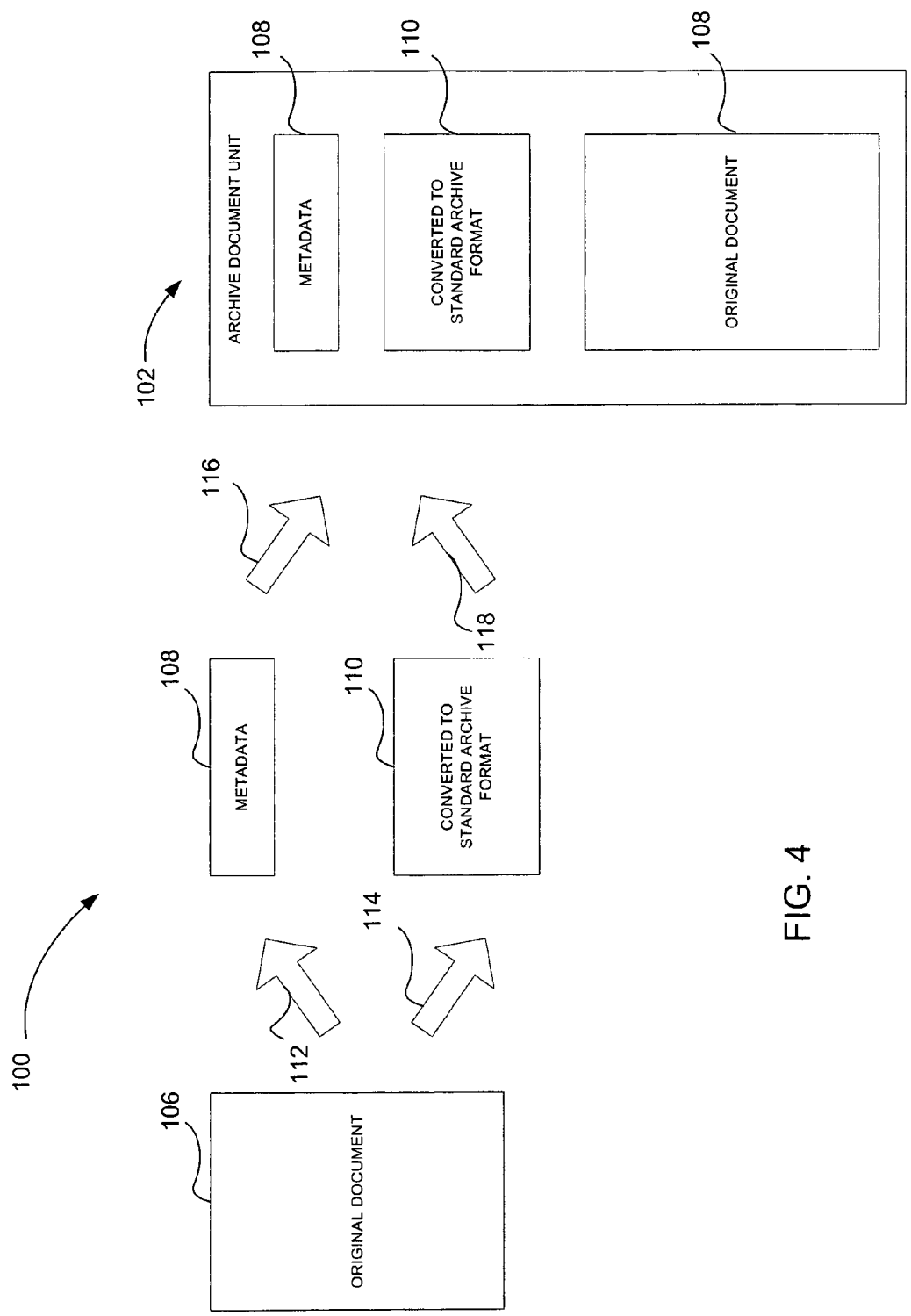
FIGS. 4 and 5 show example methods of generating archive documents at an archive system for communication to the repositories.
Figure 5:
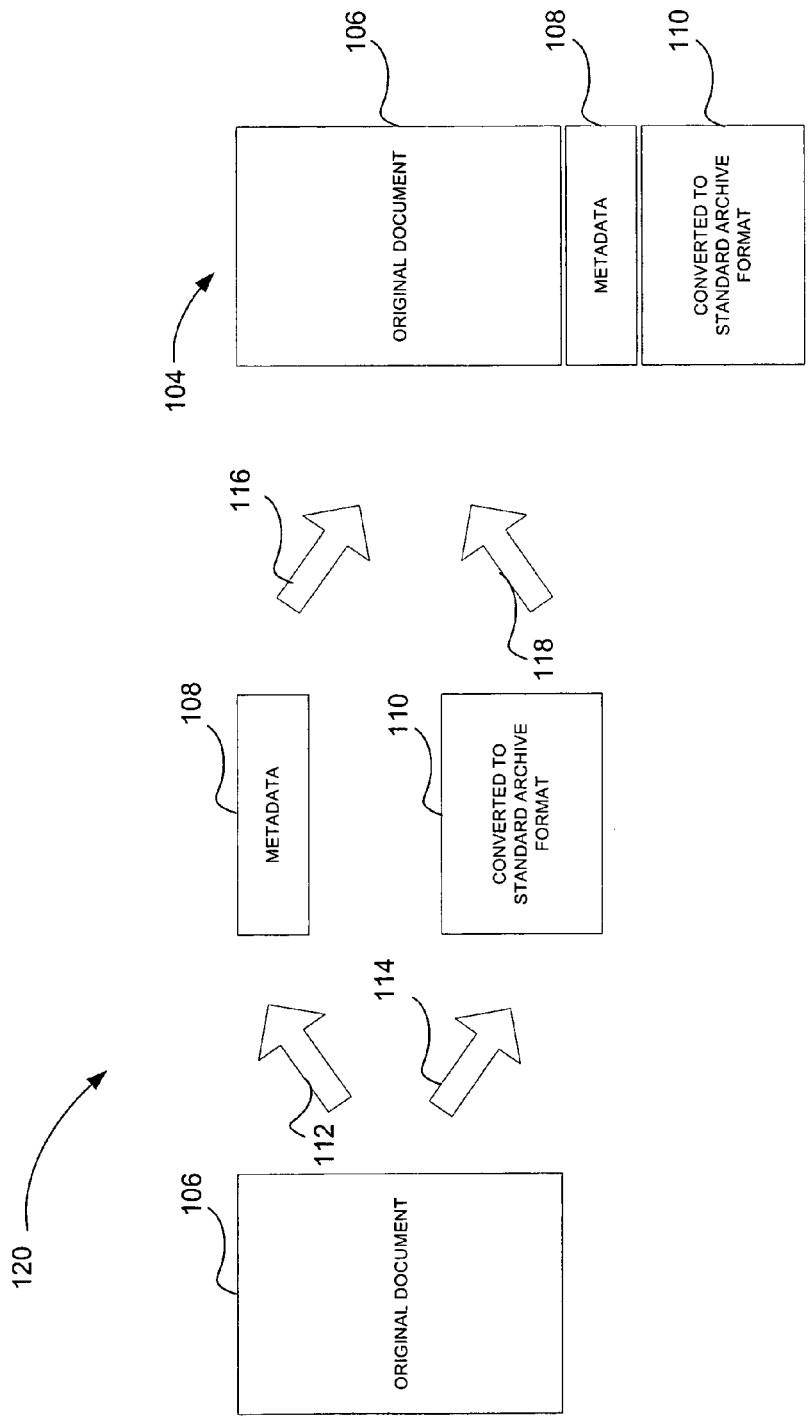

FIGS. 4 and 5 show example methods 100, 120 of generating archive documents 102, 104 at an archiving system (e.g., the archiving system 20) for communication to the repositories 22-26. Other than the configuration of the archive documents 102 and 104, the methods 100 and 120 may be substantially similar and, accordingly, like references indicate the same or similar features unless otherwise indicated. Upon receipt of an original/received document 106 from a submitter (e.g., a submitter 30-34), the archiving system 20 may obtain or extract metadata 108 associated with (or included within) the original document 106 and convert the original document 106 to an archive format 110 (see arrows 112 and 114). Thereafter, as shown by arrows 116 and 118, the metadata 108 (which may also be converted) and the archive document 110 are packaged into a single archive unit or package/container that forms the archive document 102. Examples of such a package may be performed using a ZIP utility, a Tape ARchive (TAR) utility or the like. In an embodiment, included within the archive document 104 is a copy of the original document 106. In the method 120, the metadata 108 (which may be converted) and the archive format 110 are attached to the original document 106 as opposed to being integrated into a single unit as is the case with the archive document 102. In an embodiment, the archive document 102 may be a PDF document format and the metadata 108 and the original document 106 may be embedded into the PDF document format to provide the archive document 102. The archive document 102 may also be time stamped after packing. In an example embodiment, each file may have a handle and the handles may then be packaged.

In an example embodiment, the archive format 110 in the method 120 is in a DNG format that allows the attachment of the metadata 108 and, optionally, the original document 106. The archive format 110 in the method 120 may also be PDF/A. It will be appreciated that other formats may also be used. In embodiments where the archive format 110, the metadata 108 and, optionally, the original document 106 are not transformed into the archive documents 102, 104, a handle may be used to associate or link the documents/files. The metadata 108 associated with archived document 102, 104 may be dependent upon on a category of the document. The metadata 108 may, for example, include the following document information: Title, Subject, Author, Date Created, Format (MIME type), or the like. In an embodiment, XMP-style dialogs may be used for processing metadata 108. For example, XMP-style dialogs may provide a user interface requesting data, confirming data, acquiring metadata, and so on.

Figure 6:
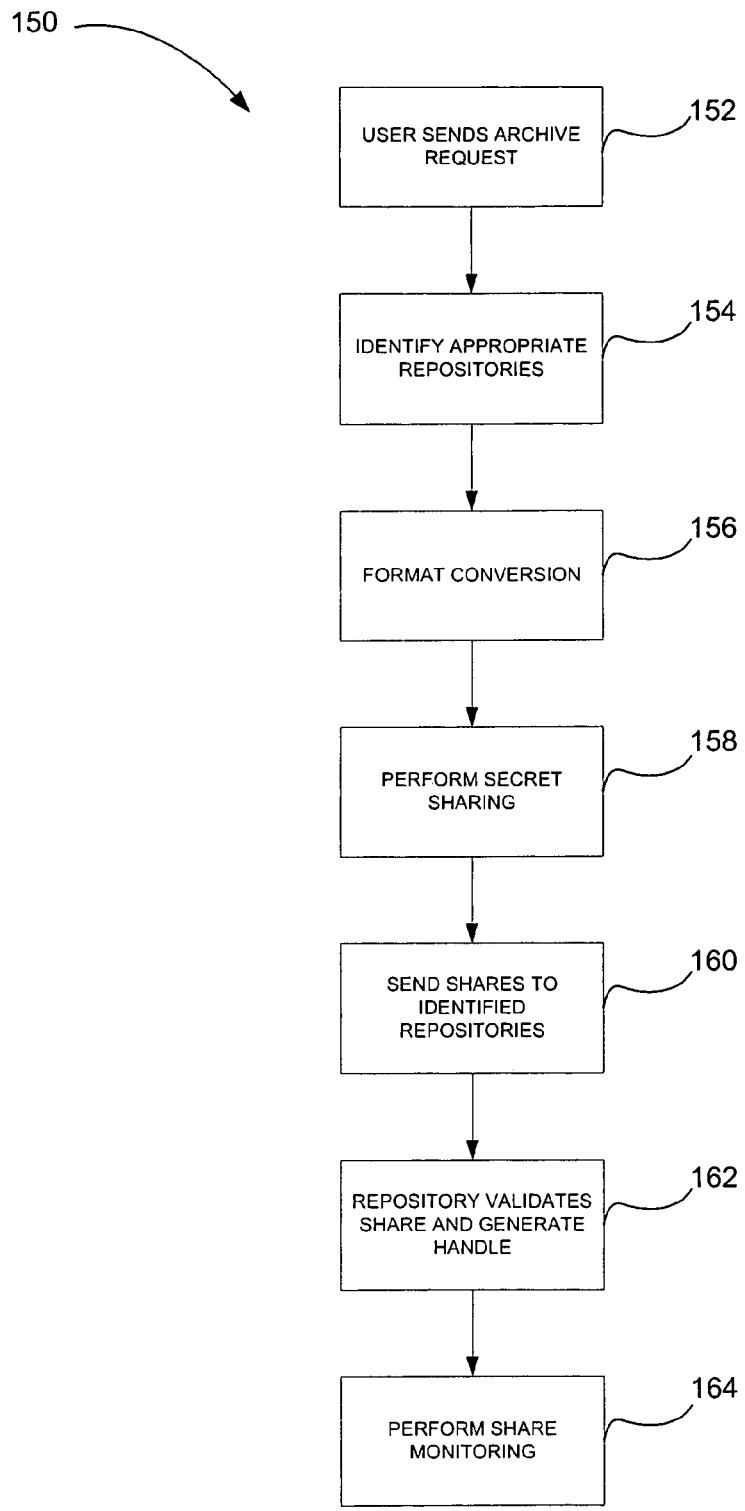
FIG. 6 shows a method of archiving documents in accordance with an example embodiment.
Figure 9:
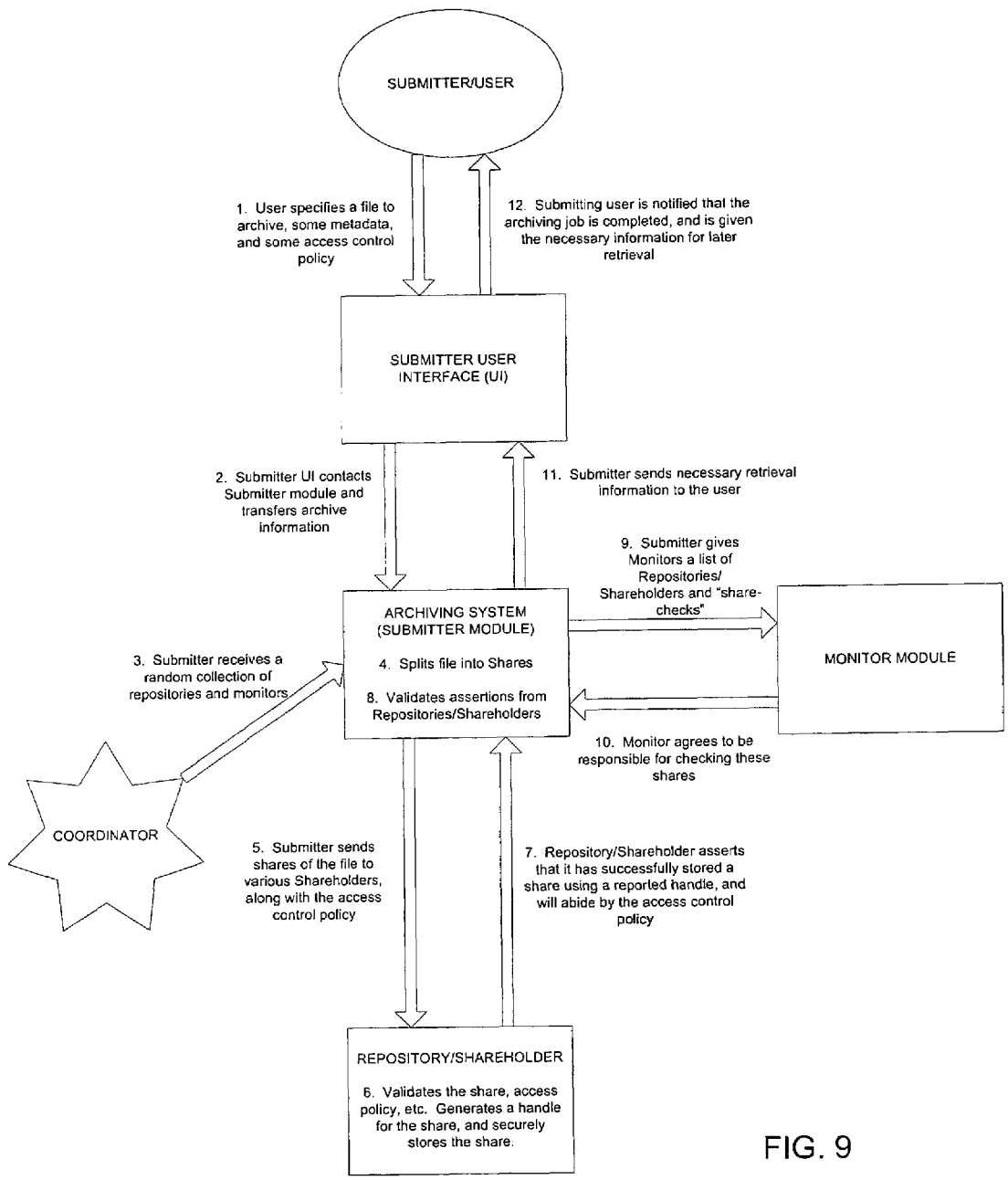
FIG. 9 shows a schematic representation of an example embodiment of the method of FIG. 6.

In FIG. 6 reference 150 generally indicates a method of archiving documents in accordance with an example embodiment. The method 150 may be performed by the archiving system 20 and it will be appreciated that not all the operations or steps described herein need be performed in all embodiments. A submitter user interface (UI) may allow a submitting user to select a file for archiving, enter some metadata about the file, and specify their archiving requirements including, for example, a retention policy and an access control policy (see block 152). Thereafter, as shown at block 154, the submitter UI may send this information in an archive request to the submitter interface module 46. As shown at block 154, a the archiving system 20 may identify a list of data or document repositories (e.g., the repositories 22-26) and may monitor distribution policies or the like. The archiving system 20 at block 156 may perform format conversion (e.g., using its format conversion module 38) and, at block 158, split the original document for archiving into shares using a secret sharing algorithm (e.g., using a secret sharing algorithm in the secret sharing/information dispersal module 40). The splitting of the original document into shares may be based on threshold information from an access policy. The archiving system 20 may (e.g., using its wide area distribution module 48) send a share to each repository 22-26, optionally, along with a copy of an access control policy for the share (see block 160). The repository 22-26 may validate the share and generate a handle. The data for the share may be stored by the repository in a safe location. The repository may assert that it has successfully stored a share under a given handle to the submitter 30-34 via the archiving system 20 (see block 162). The submitter 30-34 may verify the assertion is valid. In an embodiment, the submitter 30-34 may send a "share-check" request to the monitor module 49. In an example embodiment, the submitter may send a set of "share-checks" to the monitor, which comprise questions that only someone holding the share's data could answer correctly, and the corresponding answers "share-check" requests may be sent from the monitor to various repositories, who answer the requested question. The monitor may then compare the repository's answer to the correct answer to verify if the repository still has the original data unmodified. Thus, the monitor module 49 may accept the "share-check" request and confirm that it will monitor the status of the shares during the archiving period (e.g., 5 years, 30 years, 100 years or any other archiving period) of the document (see block 164). FIG. 9 shows a schematic representation of an example embodiment of the method 150.

Figure 7:
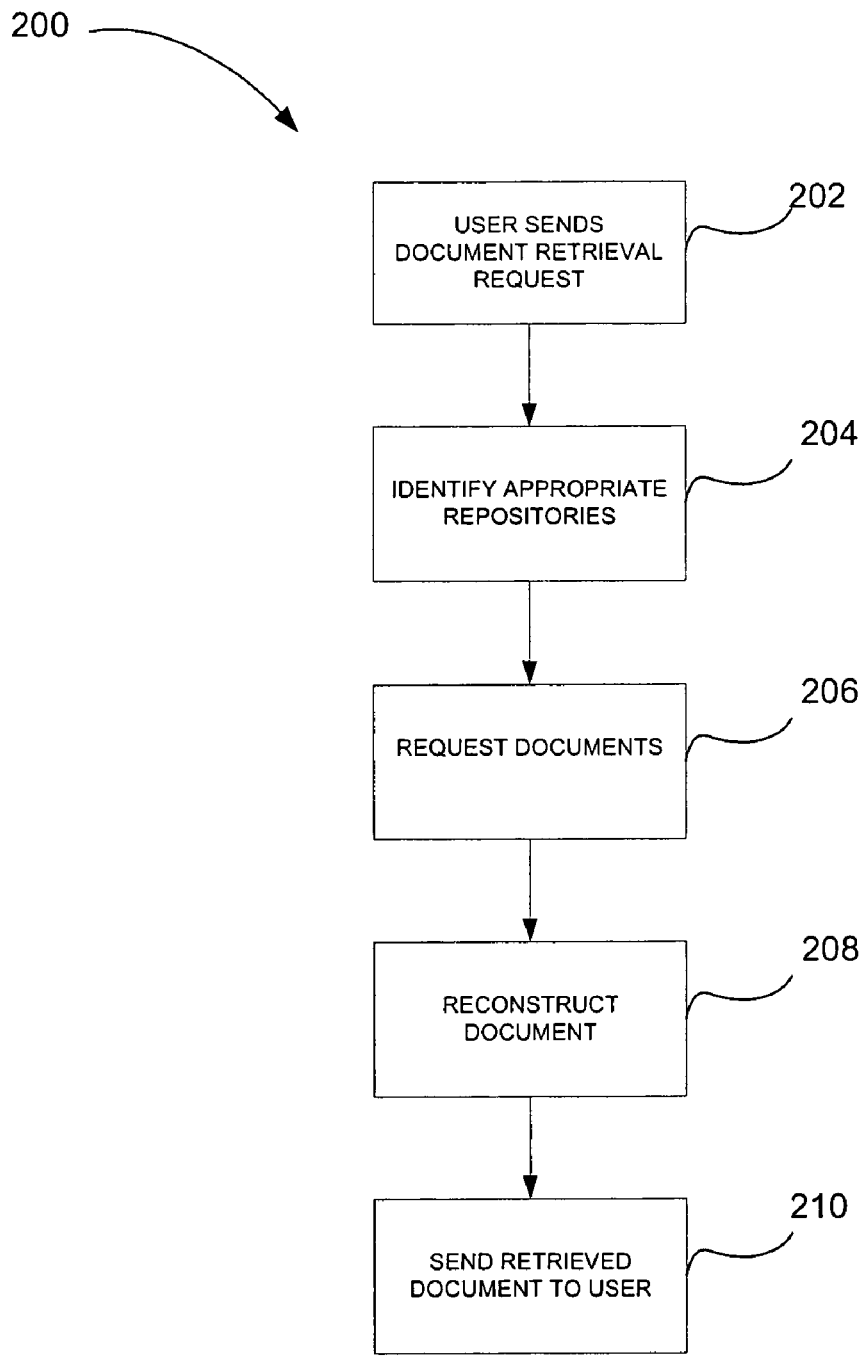
FIG. 7 shows a method of retrieving an archived document in accordance with an example embodiment.

FIG. 7 shows a method 200 of retrieving an archived document in accordance with an example embodiment. In order to retrieve the document, a retriever UI may allow the user to specify which file they want to retrieve and, for example, present their identity and, optionally, their credentials (see block 202). Thus, in an embodiment, the retriever UI module may collect the user's credentials and forward them along with the file retrieval information to the archiving system 20. The archiving system 20 (e.g., using a retriever module which may form part of the wide area distribution module 48) may use a coordinator to determine from which repositories shares must be retrieved (see block 204). For example, the coordinator identify relevant repositories (e.g., finding their IP Addresses). In an embodiment, one or more coordinators may identify which repositories shares have been sent to. When a share is moved from one repository to another, the coordinator may track such a movement and a share moved to a different repository may retain its same identity.

Figure 10:
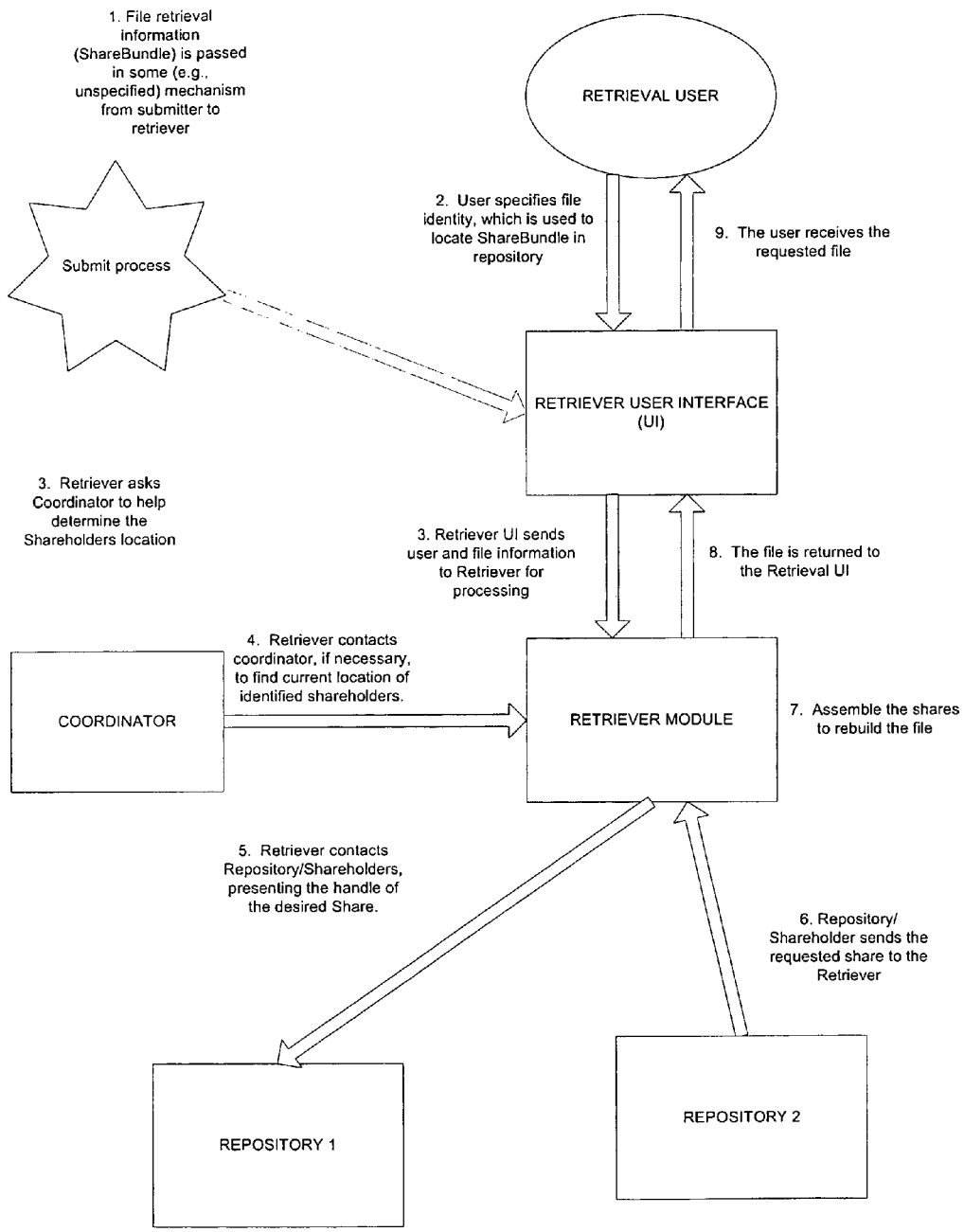
FIG. 10 shows a schematic representation of an example embodiment of the method of FIG. 7.

Returning to the method 200, as shown at block 206, the documents may be requested by contacting the repositories 22-26 and requesting the specified handle using the user's credentials (see block 206). The repository 22-26 may verify that the user's identity and credentials meet the requirements of the access control policy for that handle by contacting an Access Control Mechanism. This determination may vary from a local username/password lookup to a more complex mechanism that determines, for example, "Anyone presenting the handle, or able to prove that they are a descendent of John Jones, SSN 123-45-5012". Once authorization is established, the repository may return the requested share to the archiving system 20 (e.g., its retriever module). The archiving system 20 may then use its secret sharing/information dispersal module 40 to reconstruct the original document or file from the shares (see block 208). The reconstructed original file or document may then be sent to the user (see block 210). FIG. 10 shows a schematic representation of an example embodiment of the method 200.

Exemplary Monitor Functionality

Figure 8:
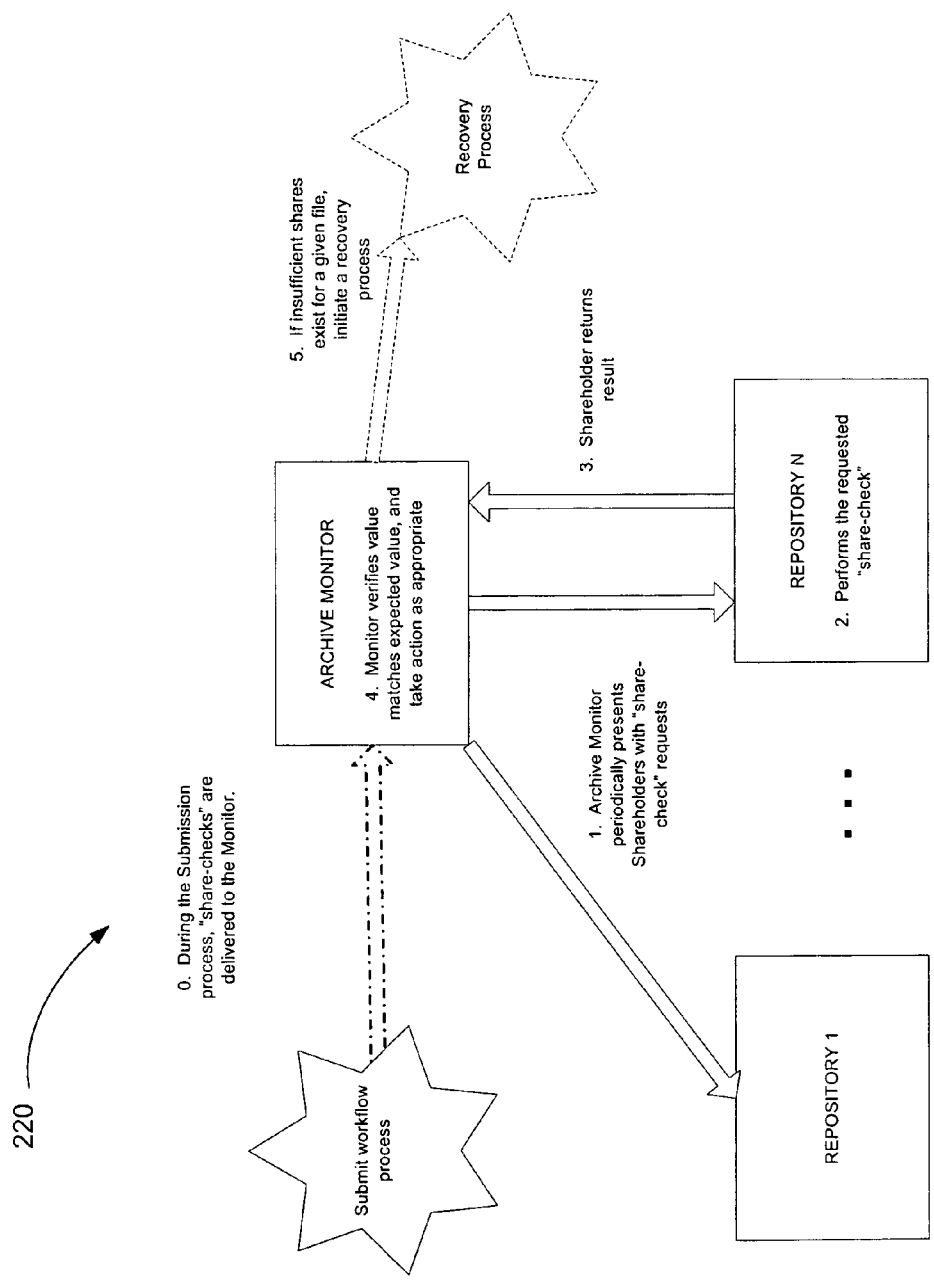
FIG. 8 shows an example method of monitoring archived documents.

FIG. 8 shows an example method 220 of monitoring archived documents. In a secret sharing embodiment, a minimum number of archived shares must exist in order to reconstruct the original document. Accordingly, a monitor (e.g., the monitor module 49) may periodically monitor the archived shares. It will however be appreciated that the monitoring functionality is not limited to an secret sharing embodiment but to any other embodiment in which, for example, a plurality of remote repositories are monitored.

The method 220 may perform the following steps or functionality:

- During a submission process, the monitor module 49 may be given a set of "share-checks," which contain sufficient information to check that a share is still valid. The monitor module may store these "share-checks" for later use. This phase may happen once per archived document and need not be a continual part of the monitoring process.
- The monitor module 49 may periodically send a "share-check request" to a repository.
- The repository may perform the requested "share-check."
- The repository may return the value to the monitor module 49.

The monitor module 49 may record this information, verify the value is correct, and take appropriate action as necessary.

If insufficient (checked) shares exist for a given file's policy, a recovery process may be initiated.

It will be appreciated that not all the steps need be performed in all embodiments.

In an embodiment, the monitor module 49 may monitor the integrity of the documents stored at the repositories 22-26. Data loss and data corruption may be detected by the "share-check". The monitor module 49 may maintain a set of share-checks for each handle, and periodically query the repository 22-26 with a handle and a randomly selected share-check. The repository 22-26 may execute the requested share-check operation, and return a value. If the value does not match what is expected, some form of corruption or loss may have occurred, and the share may be considered as no longer valid. The monitor module 49 may thus help detect corrupt and missing shares. This information may also be used to keep a status of how many shares for a particular file remain, and knowing the threshold, it can be determined how "safe" a document or file is from being lost. To help lower the chance of data loss, a larger number of shares may be distributed for a given document at the time of archiving. Increasing the number of shares for a given document to be archived may, however, also increases the risk of compromising secrecy.

In an embodiment, the archiving system 20 includes a security module for verifying document validity between parties during the submission process. Users may assert the contents of the document that they are archiving (e.g., sign the document) and be guaranteed that changes to document contents cannot go undetected. The archiving system 20 may verify the validity of the user and the user's assertion for the document contents, may convince the repository that the data being submitted is valid, and may verify that the repositories have agreed to the data and policies it was given. Each repository 22-26 may verify the validity of the user and the user's assertion for the document contents, attest to the document validity in the future, and convince the archiving system 20 that it has saved the "correct" data or document.

As mentioned above, in an embodiment, secret sharing may serve as a mechanism to enable both availability and secrecy during the archiving of documents.

In an example embodiment, in order to aid verification of documents, the following may be performed:

A user may digitally sign the document and provide the signature, along with the data, to the archiving system 20.

The archiving system 20 may verify the signature for the data to ensure the user's identity and that the data is valid.

The archiving system 20 may sign the document data as well.

Each repository 22-26, may check the validity of the signature.

Each repository 22-26 may timestamp the receipt of the share data. This may provide evidence that the original data was archived (and thus was available, considered valid) at the given time.

In an example embodiment, an electronic "notary" assertion may be obtained from a third-party. The third party may sign a statement that the signatures on a document are valid. If the notary statement is archived and time-stamped, then it may assert that the document was validly signed at the original time.

Each repository 22-26 may generate a ShareReceipt for the share and sign it.

The archiving system 20 may verify the validity of the ShareReceipt.

In an embodiment, the monitor module 49 may monitor the integrity of the documents stored at the repositories 22-26.

The shareholders or repositories 22-26 may accept archived documents (e.g., shares in a secret sharing document archiving system), store the archived documents, and retrieve them in accordance with a requested AccessPolicy and/or RetentionPolicy. The AccessPolicy may be determined by a repository 22-26 and may, for example control retrieval (e.g., how long the document is to be stored and may be time and/or event driven). In an embodiment, the archiving system 20 may be configured so that it may be periodically audited by an independent monitor module (e.g. a monitor module 49). The archive document received by each repository 22-26 may include data, metadata, and access and retention policies, from an outside source and commit the archive document to storage. In an embodiment, each repository may examine a requested AccessPolicy and accept it if it conforms to the repository's access policy. Different mechanisms may be used for controlling access, for example, access policies and identities, or a mechanism using handles. When access is controlled by handles, each repository 22-26 may, for example, generate three handles for the share (e.g., by hashing the share with a repository's secret). One handle may be for retrieval, another handle may be for deletion (or for modifying the RetentionPolicy), and the other handle may be for checking or monitoring. Documents may then be stored locally at the repository 22-26 in a protected storage facility and be indexed by the handles. Each repository 22-26 may combine the handles with a statement of commitment and a timestamp for receipt, and returns this in a ShareReceipt message to the archiving system 20.

In an embodiment, the monitor module 49 may perform a process that periodically checks a set of repositories 22-26 to make sure they still have the shares they originally committed to keep, and to take corrective action if the count of repositories 22-26 for a document drops below a threshold. In an embodiment a plurality of monitors may be provided that exceed the number of repositories 22-26. A ShareCheck list may be generated during submission to periodically verify that documents at each repositories 22-26 data are intact. Each ShareCheck may include an ID of a repository 22-26, a handle, a question to ask, and an expected answer. The monitor module 49 may need to contact a coordinator to identify a likely location for the repositories 22-26.

An example retriever interface module or RetrieverUI module may provide a user interface for retrieving files from the archiving system 20. The retriever interface module contacts the repositories 22-26, gets the shares, and reconstructs the document. It will thus be appreciated that the retriever module may form part of, or interact with, the secret sharing/information dispersal module 40. The retriever interface module may accept a ShareBundle that identifies the identities of the repositories 22-26 and the handle each is expected to have. In an embodiment using secret sharing, the retriever interface module may request archived shares from each repository 22-26 until sufficient archived shares have been retrieved to reconstruct the original document.

In an embodiment, an Access Control Mechanism may determine what level of Authorization AccessPolicy grants to a user with its given credentials. The user may be required to provide user credentials and an AccessPolicy of a handle. In response, the Access Control Mechanism may provide an authorization status and convert the user credentials into the same form as the AccessPolicy and evaluate the specified authorization. An example task may be "request a file to be archived, specifying parameters for archive period and policies" and "receive confirmation of archiving and validate the results." An access control interface may request the document(s), some metadata such as title, author, sender, date, signatures, and an access control policy (e.g., "the file may also be accessed by authorization of any corporate officer of XXXX(YYYY) corporation" or "the file may also be accessed by authorization of person NNN-NN-NNNN or their descendents or heirs"), as well as a retention policy ("it's important to keep this file for 10 years", "it's important to delete this file after 15 years").

The archiving system 20 may thus allow a user to define an Access Policy, a Retention Policy, a Deletion Policy, and a Distribution Policy. In an example embodiment, an access policy may comprise a list of principals who are allowed to access the document. Each 'principal' may be defined by a list of credentials and expiration dates. A credential may be a cryptographic credential or an out-of-band credential. For example, an access policy may include anyone who can log in with a valid certificate using my root authority as being person X, or who can prove, under the laws of the jurisdiction of the repository, that has authorization from person X. Distribution Policy Parameters may define the distribution policy. A distribution policy may determine how may different repositories 22-26 are used to store an archive document and may thus represent to what degree the system should try to ensure that document will survive for as long as it needs to and/or that the document will not be revealed to an unauthorized party. Deletion Policy Parameters may control who can order a (premature) deletion of a document. In an embodiment, anyone with proper access credentials (e.g. someone with credentials that are allowed to modify the retention policy) may be allowed to extend the retention policy. A retention policy may have two ages that may translate into two dates. For example, the retention policy may define a minimum retention period, which specifies the minimum length of holding the document, and a maximum retention period, which specifies the maximum duration the document should be retained, after which all shares should (or must) be deleted.

In an example embodiment, the archiving system 20 forms a Virtual Safety Deposit Box and may include a public interface to allow users to access the Virtual Safety Deposit Box. The Virtual Safety Deposit Box may include the example interfaces described below.

A SendToArchive Module that accepts documents for archiving, performs optional format conversion and metadata packing, computes shares of the data/document in a secret sharing implementation, and send those shares to destinations pre-configured by the user. Once share delivery has been confirmed, information necessary to retrieve the document (e.g., an "ArchiveHandle") may be assembled by the SendToArchive Module and returned to the user. In an embodiment, the SendToArchive module may be a local desktop application, or a hosted application, depending on a deployment scenario. For example, local submissions may be similar to the Acrobat extension for "Convert to Adobe PDF and Email". In an embodiment, all of the operations, including share creation and delivery, may be performed on the local workstation. It will be appreciated that in a hosted service model, email, web submission, and any other submission process may be used. The user may have an account with a hosted service, and can submit a document into their personal archive by emailing it as an attachment (e.g., to the address "username@archivesystem.com") or by logging in and submitting it through a web client.

A GetFromArchive Module may be provided to accept an ArchiveHandle and perform the operations necessary to recover the document. These operations include fetching the necessary shares and reconstructing the document. The GetFromArchive module may be a hosted application or a local desktop application.

DeleteFromArchive Module may be provided to accept an ArchiveHandle and delete the shares from each provider in the handle.

An ArchiveDataMaintenance Module may be provided to prevent loss of retrieval information. The ArchiveDataMaintenance module may periodically gather the user's local repository of ArchiveHandles and archive them.

A HandleRecovery Module may be provided a given a set of service providers (e.g., repositories) and login information, and rebuild the ArchiveHandles for all of the archived documents stored at those service providers.

A CheckOnArchives Module may be an adjunct module that periodically takes an ArchiveHandle and checks to make sure the shares have been stored correctly and are still there. In an embodiment, checking may involve retrieving the shares and making sure the shares match a hash. In addition, CheckOnArchives may implement a "repair" process where a document is retrieved and additional or new shares may be created. The CheckOnArchives may periodically verify the integrity of shares by retrieving the share data, hashing it, and comparing the result to its hash in the ArchiveHandle. In an embodiment, checking may also involve verifying the availability of a particular service provider. This may involve measuring the average availability of a service, and detecting when services have moved or been disconnected. When the checking process detects failed services (or unacceptable service levels), it may perform corrective action automatically, such as retrieving enough of the available shares to reconstruct the document and generate more unique shares (or recreate the missing ones), and distribute them to new locations. The CheckOnArchives module may also verify if a particular user's account and password information are still valid.

An AccountMaintenance Module may implement both initial account signup and also maintenance and configuration of account preferences. Operations may include specifying desired properties of actual storage providers/repositories, selecting among a list of available storage providers/repositories, setting up passwords and other account information at them, (e.g. email addresses, login information, server identities), setting notification preferences, general account maintenance, and the like. The configuration information for a user may be used by the other modules when performing operations such as archiving and monitoring.

The above example modules may include user interfaces that provide, for example, document submission, retrieval, and monitoring functionality. For an embodiment deployed locally, the user interface may be in the form of a standalone application, a set of Acrobat extensions, a print driver (for document submission, e.g., "print to archive"), etc. For a remote deployment, the user interface may be a web interface or an email server (for document submission) that accepts documents via attachments.

In an embodiment, the archiving system 20 is configured to allow sharing a document where a user may share an archived document with another person (e.g., by emailing them the shares). Migration of a share from one service provider/repository to another may be permissible. A search feature is optionally provided to find archived documents based on queries on metadata, content, etc.

In an embodiment, the submitter interface module 46 includes a graphic user interface (GUI) to facilitate user interaction with the archiving system 20. The GUI may allow a user to request that a file be archived. A local database of previously archived files may be maintained including information necessary to retrieve them. In an embodiment, a desktop application may be provided to perform all or some of the user interaction functionality. In addition or instead, a web interface may be provided. There may be many instances of the SubmitterUI module (one for each user). A local repository of ShareBundle results may be provided, and local IDs may be assigned to these results.

In an embodiment, the archiving system 20 (or any one or more components/modules) may be integrated with other products or services and thus, in an embodiment, there need not be a completely separate archiving user interface. For example, one or more of the functional modules of the archiving system 20 may be incorporated within a document processing application such as Adobe Acrobat.

A example user interface panel may include one or more the following example fields:

| | |
|---|---|
| Select files for archiving | [file selection box] |
| Enter document category | [category selection drop-down] |
| Policies | [display of names of policies for selected category] |
| Metadata | Metadata (see below) |

A system administrator at a local site may enter a site policy for converting 'document category' into specific policies. Example document category classes may include:
- a Personnel record
- Financial document
- Invention/patent document
- Product specification
- Product discussion email Example document category classes for an individual might be:
- Family photo
- Personal photo/memento
- Tax record
- Real-estate record
- Insurance policy A category and policy editor may be provided for managing the association of categories with policies. Optionally, functionality may be provided to specify (or override) one or more policies for an individual or groups of files or documents.

Metadata for documents may depend on the category and include Title, Subject, Author, Date Created, Format (e.g., MIME type), or the like. Metadata selection might use XMP-style dialogs.

A category policy user interface may be that allows a user to modify a category. The category policy user interface may include:

| | |
|---|---|
| List box | Select Category |
| Buttons | [add] [edit] [delete] [move up] [move down] |
| text box | Category Name |
| section | Access Policy |
| section | Retention Policy |
| section | Deletion Policy |
| section | Distribution Policy |

In an embodiment, the archiving system 20 may monitor a submission process in which documents are submitted for archiving. Files may be queued and processed over time. Accordingly, the archiving system 20 may manage a queue of requests, servicing of requests in a queue, and the like. When a archive document is submitted to the repositories 22-26, the archiving system 20 may, via a user interface, display information such as:

---

Number of shares (N)
Threshold number of shares to reconstruct the received or original document
Information about each repository: Identity, location, audit information, validity of receipt
Date/time submitted
Status of request

---

In an embodiment, the archiving system 20 may include one or more status monitors. The status monitors may be provided to monitor the user or submitter status, archiving system status, repository status or the like. Further one or more status monitors may be provided to monitor the status of the modules 36-49. Example status information may be as follows Submitter Status:
- single line: User category. Active? Number of items in repository.
- detailed status: show submitted document repository information.
- configuration part of SubmitterUI.

Repository/Shareholder Status:
- single line: Active? Used/Available file space.
- detailed status: repository information, rating, number of files archived, status of deletion.
- configuration: Location for local files for holding shares. Interface for specifying policies and agreements. Credentials for making assurances about longevity. Maximum storage to allocate. Entry for repository physical location of storage, company affiliation, governmental regulations followed.

Coordinator Status:
- single line: Active? Number of repositories/monitors registered
- detailed status: list of registered components, details of usage
- configuration: location of database Monitor Status:
- single line: Active? Number of active sharechecks. Count of failures.
- detailed status: list of monitored repositories, information about checks in the past, future, reputation of repositories.
- configuration: maximum number of sharechecks. Likely longevity. Credentials for asserting longevity.

In an example web deployment of the archiving system 20, one or more of the following steps may be performed:
- Log onto a web interface (to identify user).
- Double-click desktop application.
- Open window on virtual drive.
- Print-to-archive: a print driver that archives the result.
- Set up an auto-archive facility:
  - Watch folders (any file placed in this folder may get archived)
  - File type (any PDF file is archived)

Archive all files older than . . .

Outlook's auto-archive

Visual indicator on file system

In an embodiment, an application may provide a window that shows files already archived or pending. The window may provide buttons for adding, removing, and organizing files. For example, an "add button" may allow a user to select files from the user's file system. A "remove button" may include a check box to provide "remove from catalog" functionality or "destroy all copies" functionality. An "organize button" may allow a user to organize archived files into directories. The window may provide a facility for a user to choose an archiving policy (or create customized policies), or specify metadata (in an embodiment, metadata may be defaulted or sourced from the document(s)/file(s) to be archived).

Set out below is class information of an example embodiment:

| Example Remote Interface | |
|---|---|
| ICoordinator | Remote interface for Coordinator. |
| IMonitor | Remote interface for Monitor. |
| IRetriever | Remote interface for Retriever. |
| IServerBase | Remote interface for Monitor and Repository persistent services. |
| IShareholder | Remote interface for Repository/Shareholder. |
| ISubmitter | Remote interface for Submitter. |

| Example Class Summary | |
|---|---|
| AccessPolicy | An AccessPolicy may be an expression of a Submitter's desires as to how a Repository should behave when someone (who may not have the handle for a particular share) asks to get the share anyway. |
| AESClient | Client for talking with AES to convert documents to PDF before archiving |
| Coordinator | A Coordinator may be a clearinghouse for finding (available) Repositories and Monitors. |
| CoordinatorServer | The CoordinatorServer may run a Coordinator as a persistent server. |
| CoordinatorWorker | CoordinatorWorker may periodically poll registered Repositories and Monitors to verify they are still available. |
| ArchivingServer | Archiving Server. |
| DBConnection | Provides a common database connection framework for all components |
| DistributionPolicy | A DistributionPolicy may be a translation of the submitting user's desires for security (privacy of document, reliability of retrieving results, etc.) into effective parameters for choosing monitors and Repositories. |
| Handle | A Repository may generate three Handles (a retrieval handle, a check handle, and a "delete" or "modify retention policy" handle) for each share for future access - the share's retrieval handle (good for getting the share back), and the share's check handle (good for checking if the Repository has the share). |
| Metadata | Metadata includes information about a file that gets archived. |
| Monitor | A Monitor may be a process that periodically checks a set of Repositories to make sure they still have the shares they originally committed to keep, and to take corrective action if the Repository count drops below a threshold. |
| MonitorReceipt | A MonitorReceipt may be a commitment, by a Monitor, that it will monitor the shares using the sharechecks given to the monitor. |
| MonitorWorker | MonitorWorker may do the actual work of monitoring shares. |
| PersistentServer | May run a Repository or Monitor as a persistent service. |
| RegistrationInformation | RegistrationInformation may include important information about a Repository or Monitor, and is useful for determining who a given service is provided by. |
| RetentionPolicy | A RetentionPolicy may be (optionally, a translation of) the submitting user's instructions as to how long the Repository should keep the shares, and when the repository should definitely delete the shares. |
| Retriever | A Retriever may be a process that retrieves a file from the archives. |
| RetrieverServer | Run a Retriever as a server. |
| RetrieverUI | The RetrieverUI user interface for retrieving files from the archive, based on the ShareBundle. |
| SecretShare | SecretShare may comprise the core methods for splitting a file into shares and reconstructing files from shares. |
| ServerBase | May provide the common base for Monitors and Repositories. |
| ServerID | A ServerID may be a globally unique identifier for a persistent Server. |
| ServerLocation | A ServerLocation may include information helpful to find a Server again, including its (unique) ID, but also a URL. |
| Share | A Share may be the data structure saved by a Repository for each individual share of the archive document or file. |
| ShareBundle | A ShareBundle may be a collection of information about shares (the Repository IDs, ShareIDs, etc.) that allows a retriever to retrieve a file. |
| ShareCheck | A ShareCheck may be used by a Monitor to check that a Repository still has a share. |
| ShareCheckAnswer | A ShareCheckAnswer may comprise the answer to its corresponding ShareCheckQuestion. |
| ShareCheckQuestion | A ShareCheckQuestion may be a question that a Repository may be asked which requires a response with the corresponding answer. |
| Shareholder/Repository | A Shareholder/repository may be a process that accepts shares and commits to keeping them, and to retrieve them in accordance with a requested AccessPolicy and RetentionPolicy. |
| ShareReceipt | A ShareReceipt may be what a Repository gives back once it has accepted a share for long-term storage. |
| Submitter | The Submitter may accept a file for archiving. |
| SubmitterServer | May run a Submitter as a server. |
| SubmitterUI | The SubmitterUI may be a user interface for the Submitter. |

In an embodiment, the archiving system may offer a service used by consumers and citizens, but that may be offered by financial institutions, statement generators, government, or any other third-party which will allows a recipients of electronic statements, notices, and bills or the like to trust that electronic versions thereof will be safely and more reliably stored than paper copies. A bank may, for example, offer a small account (e.g., sufficient for holding their bills), for free, but upgrades for larger quantities of storage may require an additional annual fee. Accordingly, in an embodiment a "virtual safety deposit box" may be provided at one or more remote locations. Such locations may be safe from fire, or third party intrusion, for holding valuable content and may be safer from a recovery point of view than a single location.

In an embodiment one or more of the following modules may be provided:

A submitter UI (User Interface).

A desktop submitter that may be packaged as an add-on to a document processing utility such as Adobe Reader.

An email submitter service module (e.g., an SMTP server that receives mail and performs all of the operations of a submitter: converting file attachments to PDF/PDF/A, creating shares, storing them, and storing the file access information in the user's repository or sending it to the user).

Web Service submitter service module (e.g., may be similar to email service, but allow bank or statement generator to deposit document into user's account, sending user stub/notification.

Server modules.

Account management: sign up for service, get email accounts. Manage email accounts.

Interaction with client for updating passwords.

Account database and maintenance module.

System monitor services (Monitor ongoing operation of system, periodically check whether Repository mail servers are available, responding, Test integrity of file storage providers, Transfer to new services). This module may be responsible for setting up a user account—a request for an account comes in, the user's credit card or discount authorization is set up, etc.

Web site module: signup provisioning, etc.

Although an example document archiving method and system has been described, it will be appreciated that the invention may be deployed in any other environment when secret sharing is deployed, for example, in the management of cryptographic keys, or any other data processing system where a threshold of parts or pieces is required to reconstruct the original data. Further, although the method and system have been described, by way of example, using a polynomial in the secret sharing, it will be appreciated to a person of skill in the art that any other functions or mathematical operations may be used.

Figure 11:
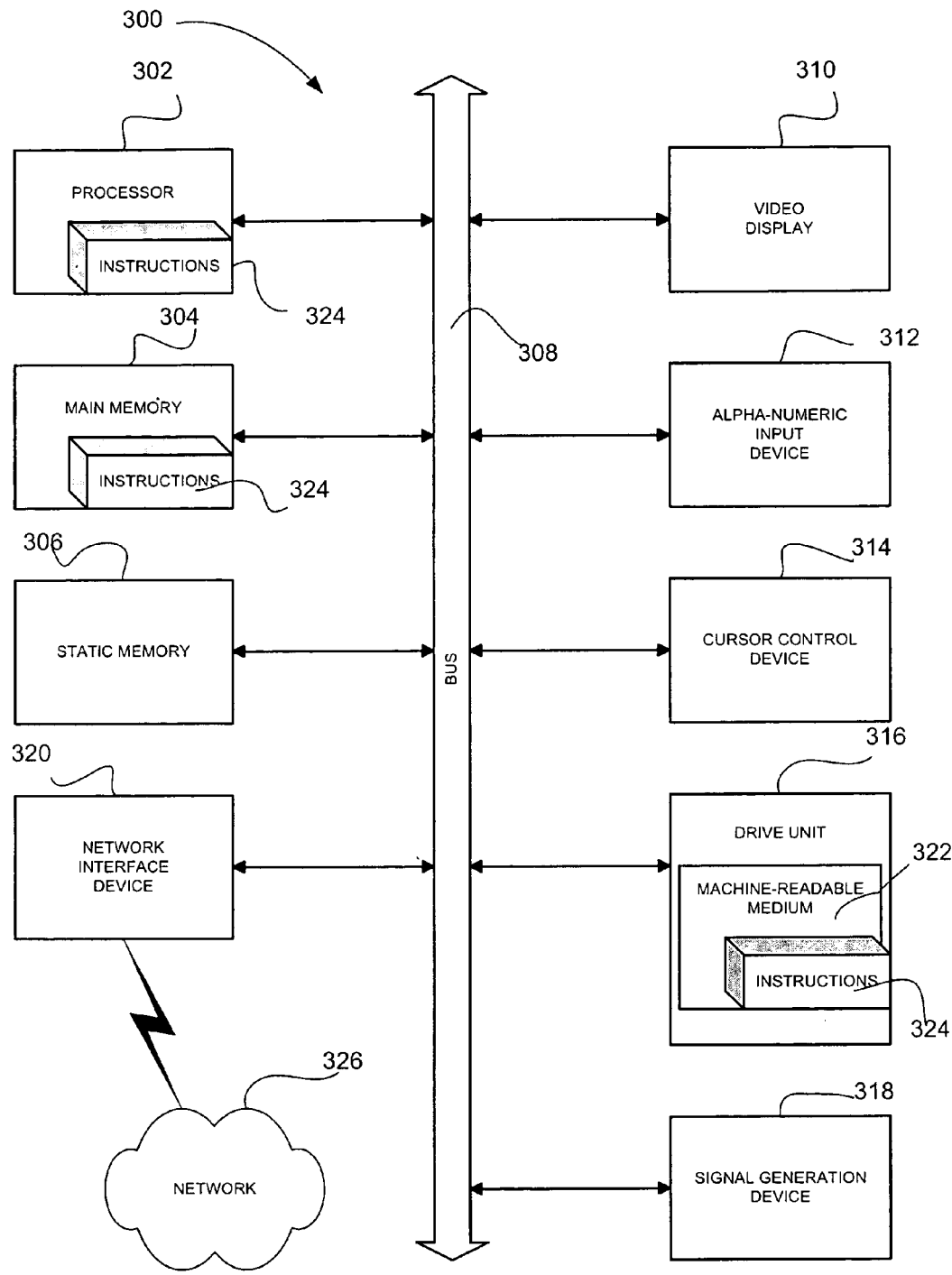
FIG. 11 shows a diagrammatic representation of a machine in the example form of a computer system for performing any one or more of the methodologies discussed herein.

FIG. 11 shows a diagrammatic representation of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to comprise any collection of machines that individually or jointly execute a set (or multiple sets) of instructions to perform any one or more of the methodologies discussed herein.

The example computer system 300 comprises a processor 302 (e.g., a central processing unit (CPU) a graphics processing unit (GPU) or both), a main memory 304 and a static memory 306, which communicate with each other via a bus 308. The computer system 300 may further comprise a video display unit 310 (e.g., a liquid crystal display (LCD) or a cathode ray tube (CRT)). The computer system 300 also comprises an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 comprises a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 204 and the processor 302 also constituting machine-readable media.

The software 324 may further be transmitted or received over a network 326 via the network interface device 320.

While the machine-readable medium 322 is shown in an example embodiment to be a single medium, the term "machine-readable medium" should be taken to comprise a single medium or multiple media (e.g., a centralized or distributed database, and/or associated caches and servers) that store the one or more sets of instructions. The term "machine-readable medium" shall also be taken to comprise any medium that is capable of storing, encoding or carrying a set of instructions for execution by the machine and that cause the machine to perform any one or more of the methodologies of the present invention. The term "machine-readable medium" shall accordingly be taken to comprise, but not be limited to, solid-state memories, optical media, and magnetic media.

Thus, a method and system to process data (e.g., archive documents) have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer implemented method to archive data, the computer implemented method comprising:
   receiving original data for archiving in a first format;
   converting the original data into N shares and storing each of the N shares at one of N repositories;
   constructing a secondary copy of the original data in a second format, the second format being an archive suitable format;
   combining the original data and the secondary copy of the original data into archive data;
   converting the archive data into shares using secret sharing;
   distributing the shares to a plurality of repositories, the distributing including storing each share at one of the plurality of repositories; and
   checking at a predetermined interval that at least K shares and a safety-factor number of further shares are recoverable from the N repositories, the at least K shares used to recover a document associated with the original data.

2. The computer implemented method of claim 1, wherein the combining of the original data and the secondary copy includes embedding the original data into the secondary copy.

3. The computer implemented method of claim 1, wherein the combining of the original data and the secondary copy includes packaging the original data and the secondary copy into an archive document.

4. The computer implemented method of claim 1, wherein the secondary format is a PDF/A.

5. The computer implemented method of claim 1, wherein the shares are distributed via a wide area network to a plurality of Internet service providers.

6. The computer implemented method of claim 5, wherein each of the shares is distributed via an email message which is stored by the Internet service provider thereby to archive the share.

7. The computer implemented method of claim 6, wherein a header of the email message is used as a time stamp for each share.

8. The computer implemented method of claim 1, wherein the repositories are independent and geographically dispersed.

9. The computer implemented method of claim 1, said computer implemented method further comprising:
providing an access control list defining access privileges associated to one or more users.

10. The method of claim 1, which includes a first handle to control access to the share and a second handle for use by a monitor application that monitors the status of the share during an archive period.

11. A tangible machine-readable medium embodying instructions which, when executed by one or more processors of a machine, cause the machine to perform a method comprising:
receiving original data for archiving in a first format;
converting the original data into N shares and storing each of the N shares at one of N repositories;
identifying metadata associated with the original data;
constructing a secondary copy of the original data in a second format; the second format being an archive suitable format;
combining the original data, the metadata, and the secondary copy of the original data to form archive data for storage;
converting the archive data for storage into shares using secret sharing;
distributing the shares to a plurality of repositories, the distribution including sharing each share at one of the plurality of repositories; and
checking at a predetermined interval that at least K shares and a safety-factor number of further shares are recoverable from the N repositories, the at least K shares used to recover a document associated with the original data.

12. The tangible machine-readable medium of claim 11, wherein the identifying of the metadata associated with the original data includes extracting the metadata from the original data.

13. The tangible machine-readable medium of claim 11, wherein the identifying of the metadata associated with the original data includes receiving user submitted metadata from a submitter user interface.

14. The tangible machine-readable medium of claim 11, wherein the metadata identifies an author of the original data.

15. A computer system to archive data, the computer system comprising:
a processor for executing instructions;
a memory device holding data including instructions, the instructions, when executed by said processor, implement:
a submitter interface module to receive original data for archiving in a first format, the original data converted into N shares and the submitter interface module to store each share at one of N repositories;
a processing module to construct a secondary copy of the original data in a second format, the second format being in an archive suitable format, said processing module converting the secondary copy of the original data into a plurality of shares using secret sharing;
a distribution module to distribute the plurality of shares to a plurality of remote repositories that each store a share of the plurality of shares; and
a monitoring module to monitor a share stored at each of the N repositories, wherein the monitoring module is to check at a predetermined interval that at least K shares and a safety-factor number of further shares are recoverable from the N repositories, and wherein the at least K shares are used to recover a document associated with the original data.

16. The computer system of claim 15, wherein the monitoring module is to receive at least one share-check and at least one share-check answer, and the monitoring module is to verify the original data by issuing a share-check request to at least one of the N repositories.

* * * * *